UNITED STATES PATENT OFFICE.

THOMAS P. KINGSFORD, OF OSWEGO, NEW YORK.

MANUFACTURE OF STARCH FROM WHEAT, CORN, &c.

SPECIFICATION forming part of Letters Patent No. 280,044, dated June 26, 1883.

Application filed April 26, 1883. (No specimens.)

*To all whom it may concern:*

Be it known that I, THOMAS P. KINGSFORD, of the city of Oswego, in the county of Oswego and State of New York, have invented a new and useful Process of Manufacturing Starch from Wheat, Corn, and all other Starch-Producing Substances, of which the following is a specification.

In practicing my invention I proceed as follows:

First. I soak the corn or other material in water, preferably at a temperature of about 62° Fahrenheit, containing as much hydrated or slaked lime as it will dissolve—that is to say, being a saturated solution of lime. Some waters will dissolve more lime than others, as is well known. The soaking should be continued until the material is softened somewhat—that is, sufficiently softened not to affect the starch, but to grind with the best results. The time occupied in soaking will vary considerably, according to the condition of the atmosphere, temperature, and nature of the substance treated—say from six to seventy-two hours; and the judgment of the operator skilled in the art of starch-making must determine when the proper condition of the soaked material has been reached.

Second. I grind the corn or other substance as usual in starch-making, after treatment as above, in any suitable mill or mills, with water—that is to say, a stream of water is delivered into the mill with the substance to be ground, as is customary in the manufacture of starch. The ground product is delivered into a suitable vat or vats, and I then pass into and all through the mass thus obtained sulphurous-acid gas, preferably compressed, until the mixture will give a distinctly acid reaction with blue litmus-paper—that is, will turn blue litmus-paper distinctly red. I let the mass stand in that condition during a period of about three hours, more or less, according to the condition of the atmosphere, &c., occasionally agitating it by any suitable ordinary means used in starch-making, while the action of the gas is taking place to secure its more perfect effect. The result will be that all the starch will be freed from the other constituents of the material, and this desired condition can be determined by examination.

Third. I then separate the starch from the mass by means of revolving screen-reels, applying water within the reel at the same time, as is ordinarily done in the manufacture of starch, or otherwise by any suitable mechanical means. The starch-cells, with more or less impurities, will pass through the sieve with the water, and the other constituent matter will be retained by the sieve and delivered by itself into any suitable receptacle. Afterward I further cleanse, wash, collect, and dry the starch by the usual well-known methods. The residuum left after the separation of the starch contains gluten in combination with husks and other solid matter, and the mass can be utilized for the manufacture of gluten by a process which I propose to patent hereafter.

By my process I am able to secure substantially all the starch of starch-producing substances at less cost for chemicals, and in less time, and with less labor than pertains to other starch-making processes heretofore employed.

Having described my invention, what I claim to be new, and desire to secure by Letters Patent of the United States, is—

1. In the art of manufacturing starch, the employment, successively in the order named, of water saturated with hydrated lime and (after grinding) sulphurous-acid gas for treating starch-producing substances, substantially as set forth.

2. The process of manufacturing starch herein described, which consists in soaking and softening grain or other starch-producing substance in water saturated with hydrated lime, then grinding it in the presence of water, then treating the ground mass with sulphurous-acid gas, and then separating the freed starch from the mass substantially as set forth.

In testimony whereof I have hereunto subscribed my name this 25th day of April, A. D. 1883.

THOMAS P. KINGSFORD.

Witnesses:
MARCUS S. HOPKINS,
HENRY L. HOWE.